(12) United States Patent
Inoue et al.

(10) Patent No.: US 12,366,634 B2
(45) Date of Patent: Jul. 22, 2025

(54) MOUNTING STRUCTURE OF OBJECT DETECTION DEVICE TO VEHICLE BODY

(71) Applicant: Honda Motor Co., Ltd., Tokyo (JP)

(72) Inventors: Naoto Inoue, Tokyo (JP); Go Shimizu, Tokyo (JP); Ryoya Kobayashi, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 416 days.

(21) Appl. No.: 17/973,478

(22) Filed: Oct. 25, 2022

(65) Prior Publication Data

US 2023/0204712 A1 Jun. 29, 2023

(30) Foreign Application Priority Data

Dec. 28, 2021 (JP) ................................. 2021-215001

(51) Int. Cl.
| | |
|---|---|
| *B60R 11/00* | (2006.01) |
| *B60R 11/02* | (2006.01) |
| *G01S 7/02* | (2006.01) |
| *G01S 17/931* | (2020.01) |
| *G01S 13/931* | (2020.01) |

(52) U.S. Cl.
CPC .......... *G01S 7/027* (2021.05); *B60R 11/0258* (2013.01); *B60R 11/0264* (2013.01); *G01S 17/931* (2020.01); *G01S 13/931* (2013.01); *G01S 2013/93277* (2020.01)

(58) Field of Classification Search
CPC . B60R 11/00; B60R 11/0258; B60R 11/0264; G01S 7/027; G01S 13/931; G01S 17/931; G01S 2013/93277
See application file for complete search history.

(56) References Cited

U.S. PATENT DOCUMENTS

| | | | | |
|---|---|---|---|---|
| 7,126,525 | B2 * | 10/2006 | Suzuki | ................ H01Q 17/001 342/175 |
| 10,793,095 | B2 | 10/2020 | Horiuchi et al. | |
| 10,906,220 | B2 * | 2/2021 | Geise | ....................... H01Q 1/42 |

FOREIGN PATENT DOCUMENTS

| | | | | |
|---|---|---|---|---|
| CN | 110023146 A | * | 7/2019 | ............. B29C 45/16 |
| CN | 110954900 A | * | 4/2020 | ............... F16J 15/52 |
| DE | 102020007011 A1 | * | 12/2020 | |

(Continued)

OTHER PUBLICATIONS

Text DO102020007011 Text (Year: 2020).*

(Continued)

*Primary Examiner* — Dennis H Pedder
(74) *Attorney, Agent, or Firm* — JCIPRNET

(57) ABSTRACT

The disclosure provides a mounting structure of an object detection device to a vehicle body capable of improving the accuracy of object detection by the object detection device and improving the durability of the object detection device. A mounting structure of a radar device, which is an object detection device for detecting objects, to a vehicle body, includes a cover member attached to the vehicle body side and covering at least a part of the radar device. The cover member is disposed on a first direction side, which is an object detection direction by the radar device when viewed from the radar device. The cover member includes a rib extending from the cover member in a second direction opposite to the first direction. The radar device is fixed to the rib.

16 Claims, 6 Drawing Sheets

(56) References Cited

FOREIGN PATENT DOCUMENTS

| | | | |
|---|---|---|---|
| DE | 102020201791 A1 * | 8/2021 | |
| JP | H10261307 | 9/1998 | |
| JP | 2000209026 | 7/2000 | |
| JP | 2004312696 | 11/2004 | |
| JP | 2011196938 | 10/2011 | |
| JP | 2012225731 | 11/2012 | |
| JP | 2014119303 | 6/2014 | |
| JP | 2015063196 | 4/2015 | |
| JP | 2018134936 | 8/2018 | |
| JP | WO2018146992 A1 * | 8/2018 | |
| JP | 2020038181 | 3/2020 | |
| JP | 2020051974 | 4/2020 | |
| JP | 2020197427 | 12/2020 | |

OTHER PUBLICATIONS

DE102020201791 Text (Year: 2021).*
JPWO2018146992 Text (Year: 2019).*
CN110023146 Text (Year: 2019).*
CN110954900 Text (Year: 2020).*
"Office Action of Japan Counterpart Application", issued on Jul. 25, 2023, with English translation thereof, pp. 1-10.
"Office Action of Japan Counterpart Application", issued on Oct. 24, 2023, with English translation thereof, p. 1-p. 12.

* cited by examiner

MOUNTING STRUCTURE OF OBJECT DETECTION DEVICE TO VEHICLE BODY

CROSS-REFERENCE TO RELATED APPLICATION

This application claims the priority benefit of Japan application serial no. 2021-215001, filed on Dec. 28, 2021. The entirety of the above-mentioned patent application is hereby incorporated by reference herein and made a part of this specification.

BACKGROUND

Technical Field

The disclosure relates to a mounting structure of an object detection device, such as a radar device, to a vehicle body for detecting objects around a vehicle.

Related Art

In recent years, the development of technology that contributes to vehicle collision avoidance and collision impact mitigation by installing a radar device, which is an object detection device that detects objects, in a vehicle and detecting obstacles in front of the vehicle with the radar device is in progress. As an example of mounting such a radar device on a vehicle, for example, the technology disclosed in Patent Literature 1 is known.

Patent Literature 1 discloses a structure in which a radar, which is an object detection device, is attached to a mounting member extending downward from a lamp body housing of a headlight mounted on a vehicle, and a cover is provided in front of the radar.

CITATION LIST

Patent Literature

[Patent Literature 1] Japanese Patent Application Laid-Open No. 2020-038181

However, in the conventional structure described in Patent Literature 1, the radar device is disposed at a position protruding below the lamp chamber of the headlight, which limits the layout configuration of the radar device, and there is a possibility that the detection accuracy cannot be sufficiently improved. Moreover, if access to the radar device is not easy, it may take time and effort to replace or maintain the radar device. Furthermore, if a part of the radar device is not covered, there is a concern that the radar device may be submerged by rainwater or the like from the underside of the vehicle body.

In view of the above, the disclosure provides a mounting structure of an object detection device to a vehicle body which has a simple configuration and is capable of improving the accuracy of object detection by the object detection device and improving the durability of the object detection device.

SUMMARY

In view of the above, a mounting structure of an object detection device to a vehicle body according to the disclosure includes: a cover member (60) attached to the vehicle body side and covering at least a part of the object detection device (40). The cover member (60) is disposed on a first direction side, which is an object detection direction by the object detection device (40) when viewed from the object detection device (40). The cover member (60) includes a rib (71 to 74) extending from the cover member (60) in a second direction opposite to the first direction. The object detection device (40) is fixed to the rib (71 to 74).

DESCRIPTION OF THE EMBODIMENTS

Figure 1:
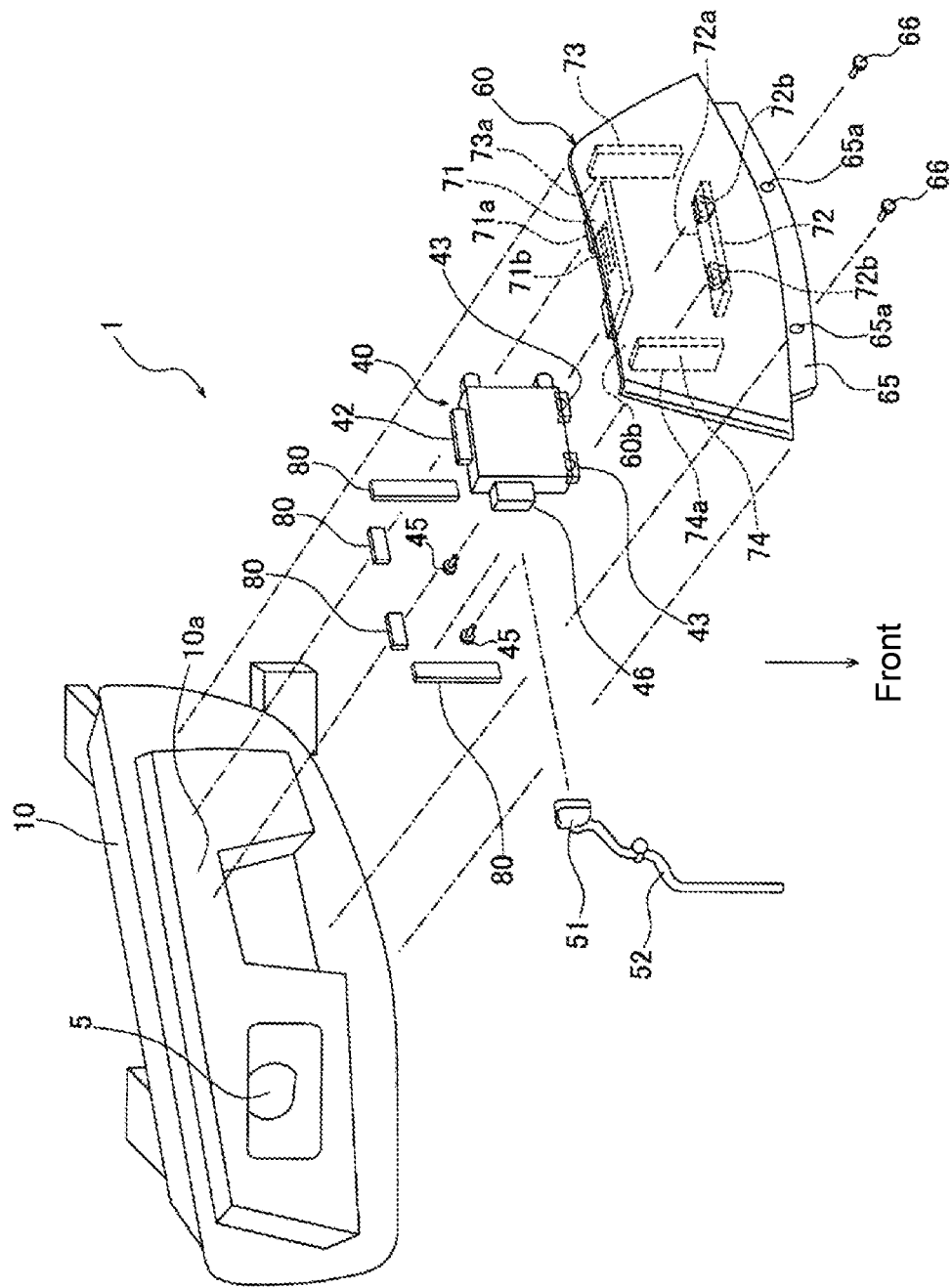
FIG. 1 is a schematic exploded perspective view showing components of a vehicle headlight unit including a mounting structure of an object detection device according to an embodiment of the disclosure.

According to the mounting structure of the object detection device to the vehicle body according to the disclosure, although the structure is simple, the object detection device is supported on the vehicle body side via the cover member, so that the positioning of the object detection device may be performed easily and accurately. In addition, since at least a part of the object detection device is covered with the cover member, the object detection device may be protected from being exposed to water from the outside and the like. Therefore, the object detection accuracy of the object detection device may be improved, and the durability of the object detection device may be improved.

Further, in this mounting structure of the object detection device to the vehicle body, an end part (71a to 74a) of the rib (71 to 74) on the second direction side may be in contact with a part (10) on the vehicle body side directly or via another member (80).

According to this configuration, since the end part of the rib on the second direction side is in contact with a part on the vehicle body side directly or via another member, with a simple configuration, the mounting state of the cover member and the object detection device may be stabilized, and the positioning accuracy of the object detection device may be further enhanced.

Further, in this mounting structure of the object detection device to the vehicle body, an end part (71a to 74a) of the rib (71 to 74) may be in contact with a part (10) on the vehicle body side via another member (80), and the another member (80) may be a cushioning member having a cushioning effect between the part (10) on the vehicle body side and the cover member (60).

According to this configuration, since the rib of the cover member is in contact with a part on the vehicle body side via the cushioning member, it is possible to effectively suppress transmission of vibrations applied to the vehicle body due to traveling of the vehicle to the object detection device via the rib of the cover member. Therefore, it is possible to further improve the accuracy of object detection by the object detection device.

Further, in this mounting structure of the object detection device to the vehicle body, the object detection device (40) may include: on one side of the object detection device, a locking part (42) that is locked to the rib (71); and on another side of the object detection device, a fastening part (43, 43) that is fastened and fixed to the rib (72) with a fastener (45).

According to this configuration, the locking part provided on one side of the object detection device is locked to the rib, and in this state, the fastening part provided on another side of the object detection device is fastened and fixed to the rib with the fastener, whereby the object detection device may be attached to the cover member. Therefore, the work of attaching and detaching the object detection device to and from the cover member may be facilitated, and the number of fasteners may be reduced to reduce the number of parts.

Further, in this mounting structure of the object detection device to the vehicle body, the cover member (60) may be attached to a housing (10) that houses a light source (5) of a headlight unit (1) mounted on the vehicle body, and the rib (71 to 74) may be in contact with the housing (10) directly or via the another member (80).

It should be noted that the above numerals in parentheses indicate the drawing reference numerals of corresponding components in the embodiments described later, for reference.

According to the mounting structure of the object detection device to the vehicle body according to the disclosure, it is possible to improve the accuracy of object detection by the object detection device and to improve the durability of the object detection device with a simple configuration.

Hereinafter, embodiments of the disclosure will be described in detail with reference to the accompanying drawings. It should be noted that in the following description, the term "front" refers to the forward direction (orientation) that is the forward direction of the vehicle body (vehicle), which will be described later, and the term "rear" refers to the rearward direction (orientation) that is the rearward direction of the vehicle body (vehicle). Further, left and right refer to the left and right respectively when the vehicle body (vehicle) faces the forward direction (front side).

FIG. 1 is a schematic exploded perspective view showing components of a vehicle headlight unit including a mounting structure of an object detection device according to an embodiment of the disclosure. The headlight unit 1 shown in FIG. 1 is the left headlight unit installed at the front end of the vehicle body. Note that the right headlight unit has a bilaterally symmetrical configuration with the left headlight unit 1 shown in FIG. 1, so illustration and description thereof will be omitted.

The headlight unit 1 shown in FIG. 1 includes a housing 10 that houses headlight components such as a light source 5, and a radar device (object detection device) 40 attached to a front surface 10a of the housing 10 via a cover member 60. The mounting structure of the radar device 40 provided in the headlight unit 1 will be described in detail below.

Figure 2:
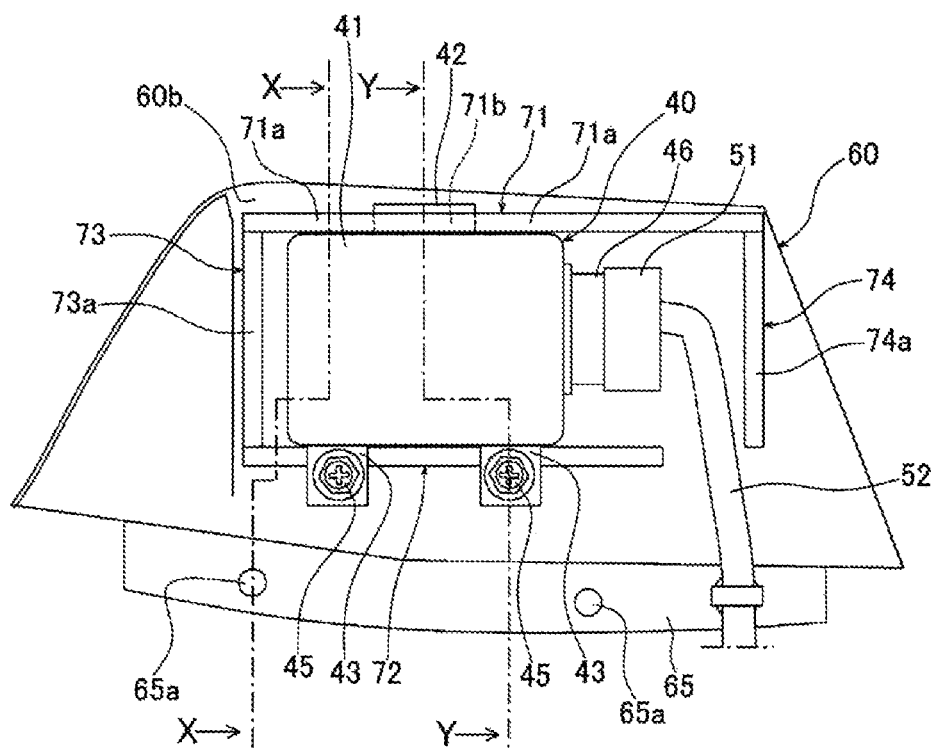
FIG. 2 is a rear view of the cover member to which the radar device is attached.
Figure 3:
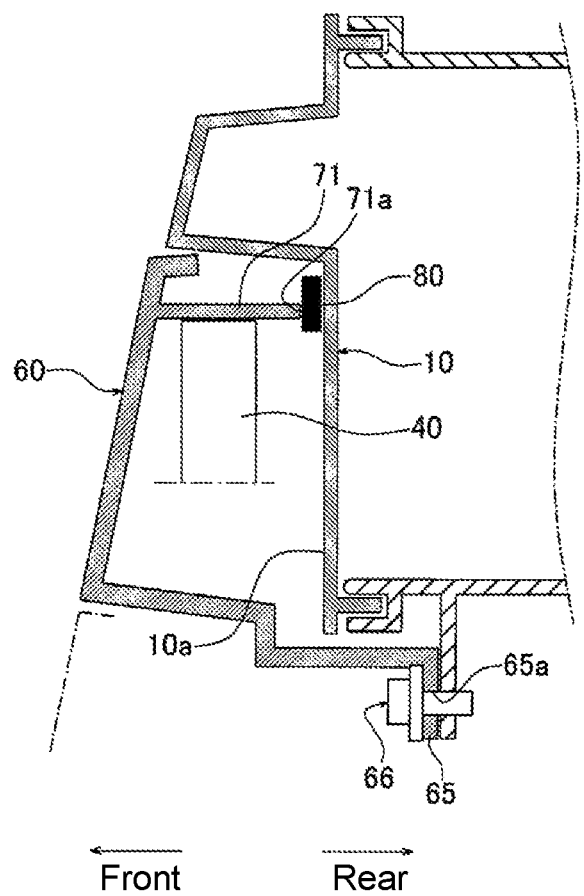
FIG. 3 is a cross-sectional view of a position corresponding to the X-X arrow of FIG. 2.
Figure 4:
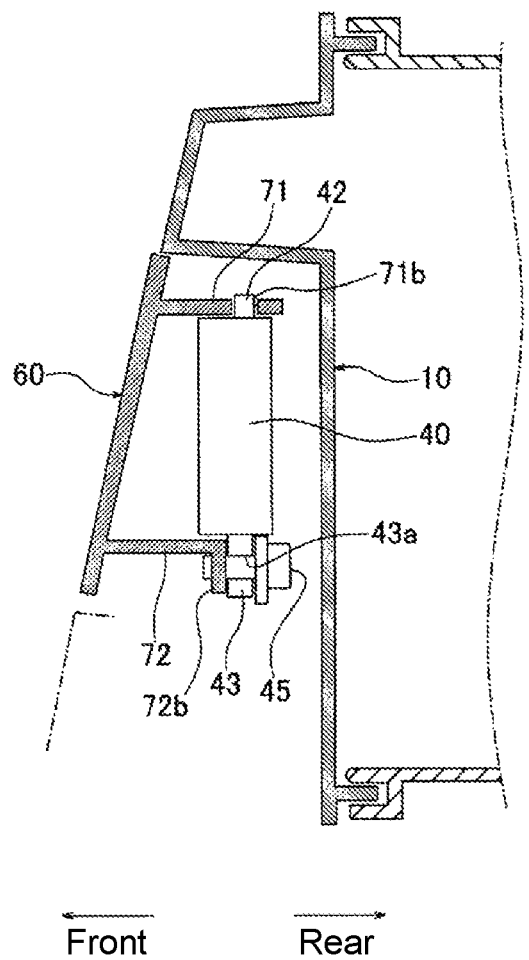
FIG. 4 is a cross-sectional view of a position corresponding to the Y-Y arrow of FIG. 2.
Figure 5:
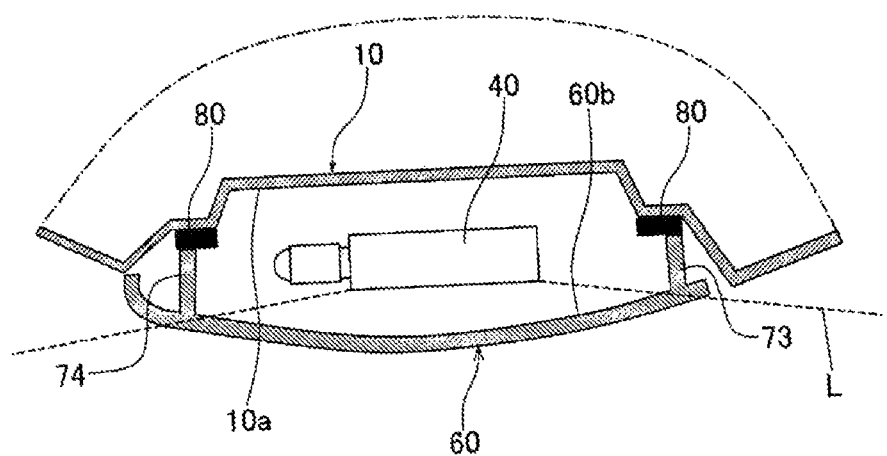
FIG. 5 is a schematic cross-sectional view of the cover member to which a radar device is attached in plan view.

FIG. 2 is a rear view of the cover member to which the radar device is attached. Further, FIG. 3 is a cross-sectional view of a position corresponding to the X-X arrow of FIG. 2; FIG. 4 is a cross-sectional view of a position corresponding to the Y-Y arrow of FIG. 2; and FIG. 5 is a schematic cross-sectional view of the cover member to which a radar device is attached in plan view. As shown in these figures, the mounting structure of the radar device 40 included in the headlight unit 1 includes a cover member 60 that is attached to the housing 10 of the headlight unit 1 and covers at least a part of the radar device 40. The cover member 60 is disposed on the front side when viewed from the radar device 40. Further, the cover member 60 is formed with ribs 71 to 74 extending rearward from the cover member 60, and the radar device 40 is fixed to the ribs 71 to 74. A dotted line L shown in FIG. 5 is a line indicating a range in which the radar device 40 may detect an object. The radar device 40 is capable of detecting an object on the front side of the vehicle from the dotted line L.

The cover member 60 is a member having a substantially rectangular outer shape and a substantially flat plate shape, and is a molded product made of synthetic resin. The cover member 60 is a member attached to the front surface 10a of the left part of the housing 10. On a rear surface 60b (surface on the housing 10 side) of the cover member 60, the four ribs 71 to 74 are formed corresponding to the upper, lower, left, and right sides of the radar device 40, respectively. Each of the ribs 71 to 74 is a thin plate-shaped protruding piece that protrudes rearward from the rear surface 60b of the cover member 60. The upper rib 71 is provided with a through hole (locked part) 71b for inserting and locking a locking piece 42 of the radar device 40, which will be described later. Further, the lower rib 72 is formed with a mounting part 72b for mounting a bolt 45 for fastening a fastening piece 43 of the radar device 40, which will be described later. The radar device 40 may be attached from the rear surface 60b side of the cover member 60 to the inner part surrounded by the ribs 71 to 74.

A lower end 65 whose surface extends downward is provided at the lower part of the cover member 60, and a through hole 65a through which a bolt 66, which will be described later, is inserted is formed in the lower end 65.

The cover member 60 configured as described above is attached to cover the front surface 10a of the housing 10. By attaching the cover member 60 to the front surface 10a of the housing 10, a part of the front surface 10a of the housing 10 is covered (closed) with the cover member 60. As a result, a space in which the radar device 40 is installed is defined between the front surface 10a of the housing 10 and the cover member 60.

Figure 6:
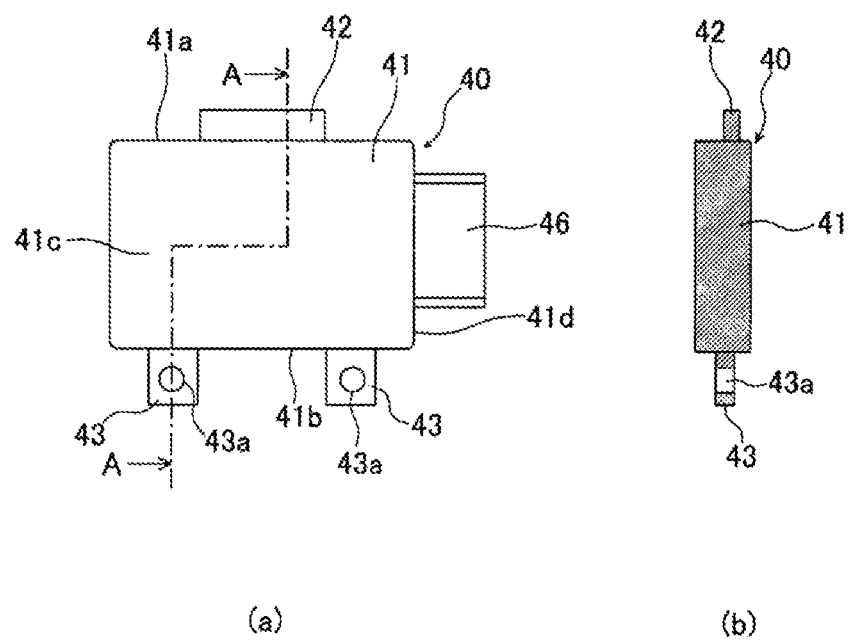
FIG. 6 is a view showing the radar device, in which (a) is a rear view, and (b) is a cross-sectional view taken along the A-A arrow in (a).

Here, the details of the mounting structure of the radar device 40 with respect to the cover member 60 will be described. FIG. 6 is a view showing the radar device 40, in which (a) is a rear view, and (b) is a cross-sectional view taken along the A-A arrow in (a). In addition, the internal structure of the radar device 40 is omitted in the cross-sectional view of (b) of FIG. 6. As shown in the figure, the radar device 40 includes a box-shaped main body 41 having a substantially rectangular (rectangular) outer shape with a predetermined thickness, a locking piece (locking part) 42 provided on an upper side 41a of the upper and lower sides of the main body 41, and a pair of fastening pieces 43 and 43 for fastening bolts (fastener) 45 (see FIG. 3) provided on a lower side 41b. The locking piece 42 is a tongue-shaped protrusion formed at a central location of the upper side 41a of the body part 41 and protruding upward. In addition, the fastening pieces 43 and 43 are tongue-shaped protrusions formed at two locations near the left and right ends of the lower side 41b of the main body 41 and protruding downward. The fastening pieces 43 and 43 are provided with through holes 43a and 43a through which the bolts 45 are inserted. In addition, a connecting part 46 for attaching and connecting a connector 51 (see FIGS. 1 and 3) to which a wiring 52 is connected is provided on a left side 41d (end surface) of the main body 41 of the radar device 40.

As described above, the radar device 40 is attached to the ribs 71 to 74 provided on the rear surface 60b of the cover member 60. At this time, first, by inserting and attaching the locking piece 42 of the radar device 40 into the through hole 71b provided in the rib 71, the locking piece 42 is locked to the rib 71. In this state, by rotating the main body 41 of the radar device 40 toward the rear surface 60b of the cover member 60 with the locking piece 42 as a fulcrum, the main body 41 of the radar device 40 is disposed in the inner part surrounded by the ribs 71 to 74 on the four sides. As a result, the through holes 43a and 43a provided in the fastening pieces 43 of the radar device 40 match the mounting part 72b provided in the rib 72 of the cover member 60, and by fastening the bolts 45 inserted through the through holes 43a to the mounting part 72b, the fastening pieces 43 and 43 are fixed to the rib 72 by fastening the bolts 45. Thus, the main body 41 of the radar device 40 is attached to the rear surface 60b of the cover member 60. In this state, the wiring 52 is connected to the radar device 40 by attaching the connector 51 to the connecting part 46 of the radar device 40.

For replacement or maintenance, the radar device 40 is detached from the cover member 60 by reversing the procedure described above. That is, first, by detaching the cover member 60 from the housing 10 of the headlight unit 1, the rear surface 60b side of the cover member 60 is accessed. Then, the bolts 45 are removed, and the main body 41 of the radar device 40 is rotated in a direction to be taken out from the ribs 71 to 74 with the locking piece 42 as a fulcrum. After that, the radar device 40 is removed from the rear surface 60b of the cover member 60 by removing the locking piece 42 inserted into the through hole 71b of the rib 71.

The cover member 60 to which the radar device 40 is attached by the above procedure is attached to the front surface 10a of the housing 10 of the headlight unit 1. This attachment is such that the lower end 65 of the cover member 60 is fixed to the front surface 10a of the housing 10 by fastening the bolt 66. Although not shown in the drawings, the upper edge of the cover member 60 is provided with a locking part that is locked to the housing 10 of the headlight unit 1. The cover member 60 is fixed to the housing 10 by fastening the bolt 66 in a state where the locking part is locked.

Further, in a state where the cover member 60 is fixed to the housing 10, a cushioning member 80 having a cushioning effect is attached between tip end parts (end parts on the rear side) 71a to 74a of the ribs 71 to 74 and the front surface 10a of the housing 10. This cushioning member 80 is a member made of rubber material or synthetic resin material having softness or flexibility (stretchability), and is attached between the tip end parts 71a to 74a of the ribs 71 to 74 and the front surface 10a of the housing 10 in a clamped state. That is, when the cover member 60 is fixed to the housing 10, the tip end parts (end parts on the rear side) 71a to 74a of the ribs 71 to 74 of the cover member 60 are brought into contact with the front surface 10a of the housing 10 via the cushioning member 80.

The mounting structure of the radar device 40 included in the headlight unit 1 of this embodiment includes a cover member 60 that is attached to the vehicle body side and covers at least a part of the radar device 40. The cover member 60 is disposed on the front side (the first direction side, which is the object detection direction by the radar device 40) when viewed from the radar device 40, and includes ribs 71 to 74 extending to the rear side (the second direction, which is a direction opposite to the first direction) from the cover member 60. The radar device 40 is fixed to these ribs 71 to 74.

According to the mounting structure of this embodiment, although the structure is relatively simple, the radar device 40 is supported via the cover member 60, so that the positioning of the radar device 40 may be performed easily and accurately. In addition, since the front part of the radar device 40 is covered with the cover member 60, the radar device 40 may be protected from being exposed to water from the outside and the like. Therefore, the object detection accuracy of the radar device 40 may be improved, and the durability of the radar device 40 may be improved.

In addition, in the mounting structure of the radar device 40 of this embodiment, the tip end parts (end parts on the rear side) 71a to 74a of the ribs 71 to 74 are in contact with the housing 10 of the headlight unit 1, which is a component on the vehicle body side, via the cushioning member (another member) 80.

According to this configuration, with a simple configuration, the mounting state of the cover member 60 and the radar device 40 may be stabilized, and the positioning accuracy of the radar device 40 may be further enhanced.

Further, according to this configuration, since the ribs 71 to 74 of the cover member 60 are in contact with the housing 10 of the headlight unit 1, which is a part on the vehicle body side, via the cushioning member 80, it is possible to effectively suppress transmission of vibrations applied to the vehicle body due to traveling of the vehicle to the radar device 40 via the ribs 71 to 74 of the cover member 60. Therefore, it is possible to further improve the accuracy of object detection by the radar device 40.

In addition, in the mounting structure of the radar device 40 of this embodiment, the radar device 40 includes the locking piece (locking part) 42 on one side thereof that is locked to the rib 71, and includes the fastening pieces (fastening part) 43 and 43 on another side that are fastened and fixed with the bolts (fastener) 45 to the rib 72.

According to this configuration, the locking piece 42 provided on one side of the radar device 40 is locked to the rib 71, and in this state, the fastening pieces 43 and 43 provided on another side of the radar device 40 are fastened and fixed to the rib 72 with the bolt 45s, whereby the radar device 40 may be attached to the cover member 60. Therefore, the work of attaching and detaching the radar device 40 to and from the cover member 60 may be facilitated, and the number of fasteners such as the bolts 45 may be reduced to reduce the number of parts.

Although the embodiments of the disclosure have been described above, the disclosure is not limited to the above embodiments, and various modifications may be made within the scope of the technical ideas described in the claims, the specification and the drawings. For example, in the above embodiments, the cover member 60 is attached to the housing 10 of the headlight unit 1 mounted on the vehicle body, but the cover member provided in the mounting structure of the disclosure may be attached to a part other than the housing of the headlight unit as long as it is a part mounted on the vehicle body (part on the vehicle body side). Further, in the above embodiments, the tip end parts of the ribs of the cover member are in contact with the housing of the headlight unit, which is a part on the vehicle body side, via a cushioning member (another member); however, in the mounting structure of the disclosure, the tip end parts of the ribs of the cover member may be in direct contact with a part on the vehicle body side without any other member being interposed therebetween.

What is claimed is:

1. A mounting structure of an object detection device for detecting objects to a vehicle body, the mounting structure comprising:
   a cover member attached to the vehicle body side and covering at least a part of the object detection device, wherein the cover member is disposed on a first direction side, which is an object detection direction by the object detection device when viewed from the object detection device, the cover member comprises ribs extending from the cover member in a second direction opposite to the first direction, each of the ribs is a thin plate-shaped protruding piece protruding from a surface of the second direction side of the cover member, and wherein the object detection device is fixed to the ribs, and the object detection device is surrounded by the ribs.

2. The mounting structure of the object detection device to the vehicle body according to claim 1, wherein an end part of the rib on the second direction side is in contact with a part on the vehicle body side via another member.

3. The mounting structure of the object detection device to the vehicle body according to claim 1, wherein an end part of the rib on the second direction side is in contact with a part on the vehicle body side via another member, and the another member is a cushioning member having a cushioning effect between the part on the vehicle body side and the cover member.

4. The mounting structure of the object detection device to the vehicle body according to claim 2, wherein the end part of the rib on the second direction side is in contact with a part on the vehicle body side via another member, and the another member is a cushioning member having a cushioning effect between the part on the vehicle body side and the cover member.

5. The mounting structure of the object detection device to the vehicle body according to claim 1, wherein the object detection device comprises:

on one side of the object detection device, a locking part that is locked to the rib; and on another side of the object detection device, a fastening part that is fastened and fixed to the rib with a fastener.

6. The mounting structure of the object detection device to the vehicle body according to claim 2, wherein the object detection device comprises:

on one side of the object detection device, a locking part that is locked to the rib; and on another side of the object detection device, a fastening part that is fastened and fixed to the rib with a fastener.

7. The mounting structure of the object detection device to the vehicle body according to claim 3, wherein the object detection device comprises:

on one side of the object detection device, a locking part that is locked to the rib; and on another side of the object detection device, a fastening part that is fastened and fixed to the rib with a fastener.

8. The mounting structure of the object detection device to the vehicle body according to claim 4, wherein the object detection device comprises:

on one side of the object detection device, a locking part that is locked to the rib; and on another side of the object detection device, a fastening part that is fastened and fixed to the rib with a fastener.

9. The mounting structure of the object detection device to the vehicle body according to claim 1, wherein the cover member is attached to a housing that houses a light source of a headlight unit mounted on the vehicle body, and the rib is in contact with the housing via another member.

10. The mounting structure of the object detection device to the vehicle body according to claim 2, wherein the cover member is attached to a housing that houses a light source of a headlight unit mounted on the vehicle body, and the rib is in contact with the housing via the another member.

11. The mounting structure of the object detection device to the vehicle body according to claim 3, wherein the cover member is attached to a housing that houses a light source of a headlight unit mounted on the vehicle body, and the rib is in contact with the housing via the another member.

12. The mounting structure of the object detection device to the vehicle body according to claim 4, wherein the cover member is attached to a housing that houses a light source of a headlight unit mounted on the vehicle body, and the rib is in contact with the housing via the another member.

13. The mounting structure of the object detection device to the vehicle body according to claim 5, wherein the cover member is attached to a housing that houses a light source of a headlight unit mounted on the vehicle body, and the rib is in contact with the housing via another member.

14. The mounting structure of the object detection device to the vehicle body according to claim 6, wherein the cover member is attached to a housing that houses a light source of a headlight unit mounted on the vehicle body, and the rib is in contact with the housing via the another member.

15. The mounting structure of the object detection device to the vehicle body according to claim 7, wherein the cover member is attached to a housing that houses a light source of a headlight unit mounted on the vehicle body, and the rib is in contact with the housing via the another member.

16. The mounting structure of the object detection device to the vehicle body according to claim 8, wherein the cover member is attached to a housing that houses a light source of a headlight unit mounted on the vehicle body, and the rib is in contact with the housing via the another member.

* * * * *